United States Patent [19]
Nishio

[11] Patent Number: 5,844,513
[45] Date of Patent: Dec. 1, 1998

[54] METHOD AND APPARATUS FOR TRANSMITTING SIGMA DELTA MODULATED AUDIO SIGNALS

[75] Inventor: Ayataka Nishio, Kanagawa, Japan

[73] Assignee: Sony Corporation, Tokyo, Japan

[21] Appl. No.: 791,223

[22] Filed: Jan. 30, 1997

[30]     Foreign Application Priority Data

Feb. 15, 1996   [JP]   Japan .................................... 8-027962

[51] Int. Cl.$^6$ ................................................ H03M 7/32
[52] U.S. Cl. ................................................ 341/143; 381/2
[58] Field of Search .................................. 341/139, 143;
381/10, 58, 61, 98, 2

[56]            References Cited

U.S. PATENT DOCUMENTS

| | | | |
|---|---|---|---|
| 4,016,370 | 4/1977 | Laoteppitaks et al. | 179/84 |
| 5,359,463 | 10/1994 | Shirochi et al. | 360/19.1 |
| 5,363,101 | 11/1994 | Ueki | 341/143 |
| 5,390,043 | 2/1995 | O'Byrne | 359/191 |
| 5,422,913 | 6/1995 | Wilkinson | 375/247 |
| 5,506,907 | 4/1996 | Ueno et al. | 381/18 |

FOREIGN PATENT DOCUMENTS 0512619   11/1992   European Pat. Off. ....... H03H 17/06

*Primary Examiner*—Marc S. Hoff
*Assistant Examiner*—Peguy JeanPierre
*Attorney, Agent, or Firm*—Jay H. Maioli

[57]                    ABSTRACT

When transmitting a sigma-delta modulated signal produced from plural channel signals through a sigma-delta modulator, the main channel is made to have a different sampling frequency from the sub channel, for enhancing transmission efficiency.

8 Claims, 10 Drawing Sheets

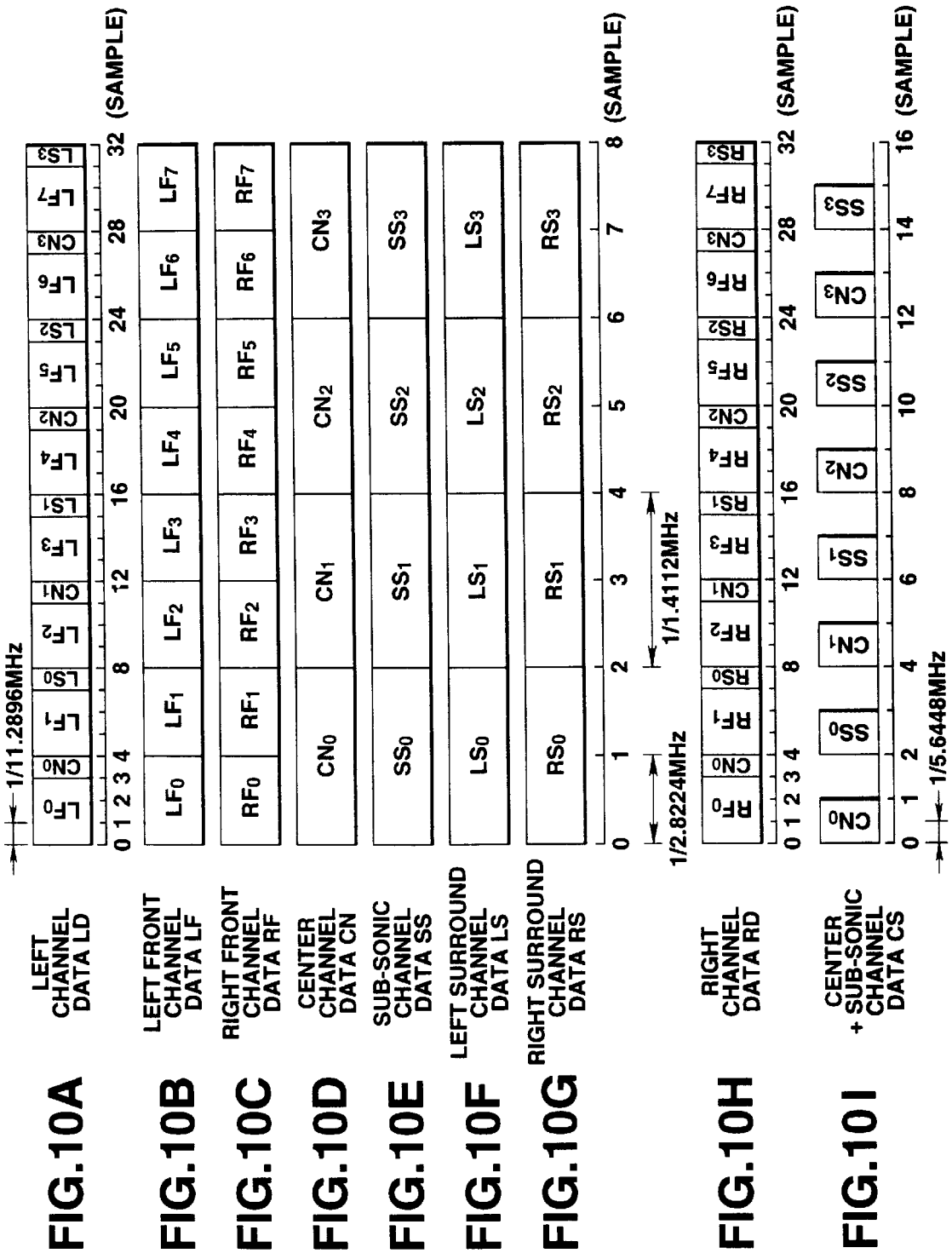

METHOD AND APPARATUS FOR TRANSMITTING SIGMA DELTA MODULATED AUDIO SIGNALS

BACKGROUND OF THE INVENTION

Field of the Invention

The present invention relates to a method and an apparatus for transmitting a sigma-delta modulated signal converted from a multi-channel signal composed of two or more channel signals related to each other.

For example, there has been known a digital audio signal which is recorded on an audio recording medium such as an optical disk representative of a compact disk and a magnetic tape representative of a digital audio tape(DAT). The digital audio signal is given its specified formats of a sampling frequency and a quantizing bit number. The sampling frequency is specified to be 44.1 kHz, 48 kHz and so forth. The quantizing bit number is specified to be 16 bits, 2 bits and so forth.

In the digital audio signal whose transmission band is as low as 20 kHz and dynamic range is as low as 100 dB, assuming that the audio signal is recorded or reproduced from a multi-channel sound source composed of plural sound source channels related to each other or the multi-channel signal is transmitted or received, it is necessary to record the data of all the channels at the same sampling frequency and at the same bit number, because the transmission band and the dynamic range are not allowed to be narrower. This brings about a shortcoming that the capacity and the transfer rate of the data to be recorded are increased in proportion to the number of the channels.

Also in a transmission method for a sigma-delta ($\Sigma\Delta$) signal wherein the audio signal ($\Sigma\Delta$ modulation signal) converted into a digital audio signal through one-bit sigma-delta modulation is recorded or reproduced, or transmitted or received, the conventional multi-channel system being compatible with 2-channel reproduction has an assumption that the same type of signals are used for all the channels, that is, a one-bit signal sigma-delta ($\Sigma\Delta$) modulated at one sampling frequency. This also results in increasing the capacity and the transfer rate of the data to be recorded in proportion to the number of channels.

For example, consider recording or reproduction of a sound signal of a 6-channel sound source of sigma-delta ($\Sigma\Delta$) modulated at a sampling frequency 64 fs that is 64 times as high as a sampling frequency of an ordinary compact disk (=44.1 kHz). In this example, the 6-channel sound source, as shown in FIG. 1, contains a left front channel 1 that is a speaker located at the left front of a listener, a right front channel 2 that is a speaker located at the right front of the listener, a center channel 3 that is located in front of a listener, a sub-sonic channel 4 that is located behind the center channel 3, a left surround channel 5 that is a speaker located at the left rear of a listener, and a right surround channel 6 that is a speaker located at the right rear hand of a listener.

When these six signals of the 6-channel sound source are sigma-delta ($\Sigma\Delta$) modulated at a sampling clock of a frequency 64 fs, those signals are generated as left front channel data LF as shown in FIG. 2A, right front channel data RF as shown in FIG. 2B, front (center) channel data CN as shown in FIG. 2C, sub-sonic channel data SS as shown in FIG. 2E, left surround channel data LS as shown in FIG. 2E, and right surround channel data RS as shown in FIG. 2F. Those data are one-bit sigma-delta ($\Sigma\Delta$) modulated digital signals that are independent of each other.

The one-bit signal sigma-delta ($\Sigma\Delta$) modulated at the sampling clock of the frequency 64 fs has a data rate of 2.8224 Mbps. While the ordinary stereo sound source has a data rate of 5.6448 Mbps, this 6-channel sound source is made to have a data rate of 16.9344 Mbps (=2.8224×6), which is apparently six times as large as the data rate of one channel. In order to record the same program source, therefore, it is necessary to secure a media capacity of 16.9344 Mbps that is three times as large as the data rate (5.6448 Mbps) of the ordinary stereo sound source.

Further, as shown in FIGS. 3A and 3H, in the 2-channel compatible reproduction wherein the sound signal is reproduced by the two channels, that is, the left front channel LD and the right front channel RD of the six channels, it is necessary to additionally provide reproducing hardware with a digital signal processing unit for pre-adding the data of these channels at a proper rate.

The left front channel data LF shown in FIG. 3B that is an output of the left front channel 1, the right front channel data RF shown in FIG. 3C that is an output of the right-left channel 2, the center channel data Cn as shown FIG. 3D that is an output of the center channel 3, the sub-sonic channel data SS shown in FIG. 3E that is an output of the sub-sonic channel 4, the left surround channel data LS shown in FIG. 3F that is an output of the left surround channel 5, and the right surround channel data RS shown in FIG. 3G that is an output of the right surround channel 6 are expanded on the time base of each stream of the left channel data LF shown in FIG. 3A and the right channel data RD shown in FIG. 3H at an equal rate.

As a result, as shown in FIG. 3A, the left channel data LD is composed of the left front channel data LF, the center channel data CN, the sub-sonic channel data SS and the left surround channel data LS expanded on the time base of the left channel data LD itself. As shown in FIG. 3H, the right channel data RD is composed of the right front channel data RF, the center channel data CN, the sub-sonic channel data SS and the right surround channel data RS expanded on the time base of the right channel data RD itself. And, the digital-to-analog converter located in the reproducing side is required to enhance the sampling clock to 256 fs that is four times as large as 64 fs. This makes it possible to perform the 2-channel compatible reproduction.

However, if the data of these channels are expanded on the time base at an equal rate, the signals of these channels are required to be added at that equal rate. This therefore needs to manage the recording volume levels of these channels so that those volume levels are properly balanced in the 2-channel compatible reproduction.

The present invention is made in consideration of the above-mentioned conditions, and it is an object of the present invention to provide a method and an apparatus for transmitting a signal which enables to keep the sound quality in the multi-channel reproduction high at a low data transfer rate and reduced media capacity.

SUMMARY OF THE INVENTION

In order to overcome the foregoing shortcomings, according to an aspect of the invention, an apparatus for transmitting a sigma-delta modulated signal converted from each signal of two or more channels, includes a first modulator for signal-delta modulating a channel signal of one group of the multi-channels at a far higher first sampling frequency than an audio band frequency, a second modulator for sigma-delta modulating a channel signal of another group of the multi-channels at a sampling frequency that is far higher than the audio band frequency and lower than the first sampling frequency, a mixer for mixing an output digital signal of the first modulator with an output digital signal of the second modulator, and a transmitter for transmitting a mixed digital signal produced by the mixer.

DESCRIPTION OF THE DRAWINGS

FIG. 10A is a view showing a data structure of left channel data LD applied to the embodiment of the present invention;

FIG. 10B is a view showing a data structure of left front channel data LF applied to the embodiment of the present invention;

FIG. 10C is a view showing a data structure of right front channel data RF applied to the embodiment of the present invention;

FIG. 10D is a view showing a data structure of center channel data CN applied to the embodiment of the present invention;

FIG. 10E is a view showing a data structure of sub-sonic channel data SS applied to the embodiment of the present invention;

FIG. 10F is a view showing a data structure of left surround channel data LS applied to the embodiment of the present invention;

FIG. 10G is a view showing a data structure of right surround channel RS applied to the embodiment of the present invention;

FIG. 10H is a view showing a data structure of right channel data RD applied to the embodiment of the present invention; and FIG. 10I is a view showing a data structure of data CS made by adding the center channel data to the sub-sonic channel applied to the embodiment of the present invention.

DESCRIPTION OF THE PREFERRED EMBODIMENTS

Hereafter, the description will be oriented to a method and an apparatus for transmitting a signal according to the present invention with reference to the drawings.

Figure 4:
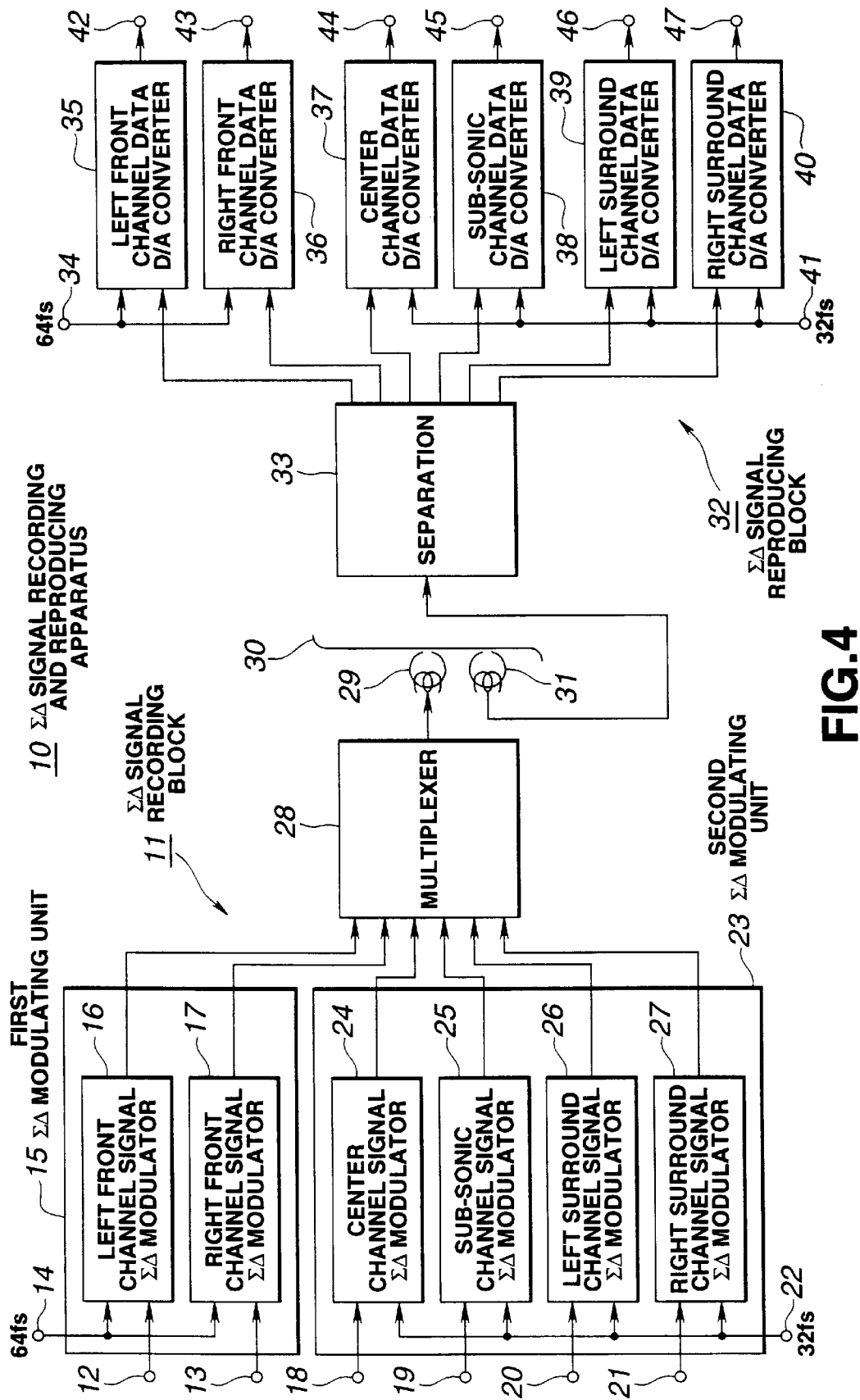
FIG. 4 is a block diagram showing a recording and reproducing apparatus to which the present invention applies.

At first, as shown in FIG. 4, the present invention is embodied as a sigma-delta ($\Sigma\Delta$) recording and reproducing apparatus 10 that includes a sigma-delta ($\Sigma\Delta$) signal recording block 11 and a sigma-delta ($\Sigma\Delta$) signal reproducing block 32. In this sigma-delta ($\Sigma\Delta$) recording and reproducing apparatus 10, the sigma-delta ($\Sigma\Delta$) signal recording block 11 is operated to record on a magnetic tape 30 a sigma-delta modulated signal converted from a multi-channel signal composed of audio signals of six channels being related to each other and then the sigma-delta ($\Sigma\Delta$) signal reproducing block 32 is operated to reproduce the sigma-delta ($\Sigma\Delta$) modulated signal from the magnetic tape 30.

The sigma-delta ($\Sigma\Delta$) signal recording block 11 provides a first and a second sigma-delta ($\Sigma\Delta$) modulating units 15 and 23. The first sigma-delta ($\Sigma\Delta$) modulating unit 15 operates to selectively modulate the left front channel signal and the right front channel signal supplied from input terminals 12 and 13 among the multi-channel audio signals sent from the 6-channel multi-channel sound source at a sampling frequency 64 fs. This sampling frequency 64 fs is 64 times as great as the sampling frequency fs (=44.1 kHz) used for the compact disk (CD). The second sigma-delta (ΣΔ) modulating unit 23 operates to selectively modulate the center channel signal, the sub-sonic channel signal, the left surround channel signal and the right surround channel signal supplied from input terminals 18, 19, 20 and 21 among the multi-channel audio signals at a sampling frequency 32 fs. This sampling frequency 32 fs is 32 times as great as the sampling frequency fs used for the compact disk. The center channel signal, the subsonic channel signal, the right surround channel signal and the left surround channel signal are auxiliary audio signals to the right front channel signal and the left front channel signal.

Figure 1:
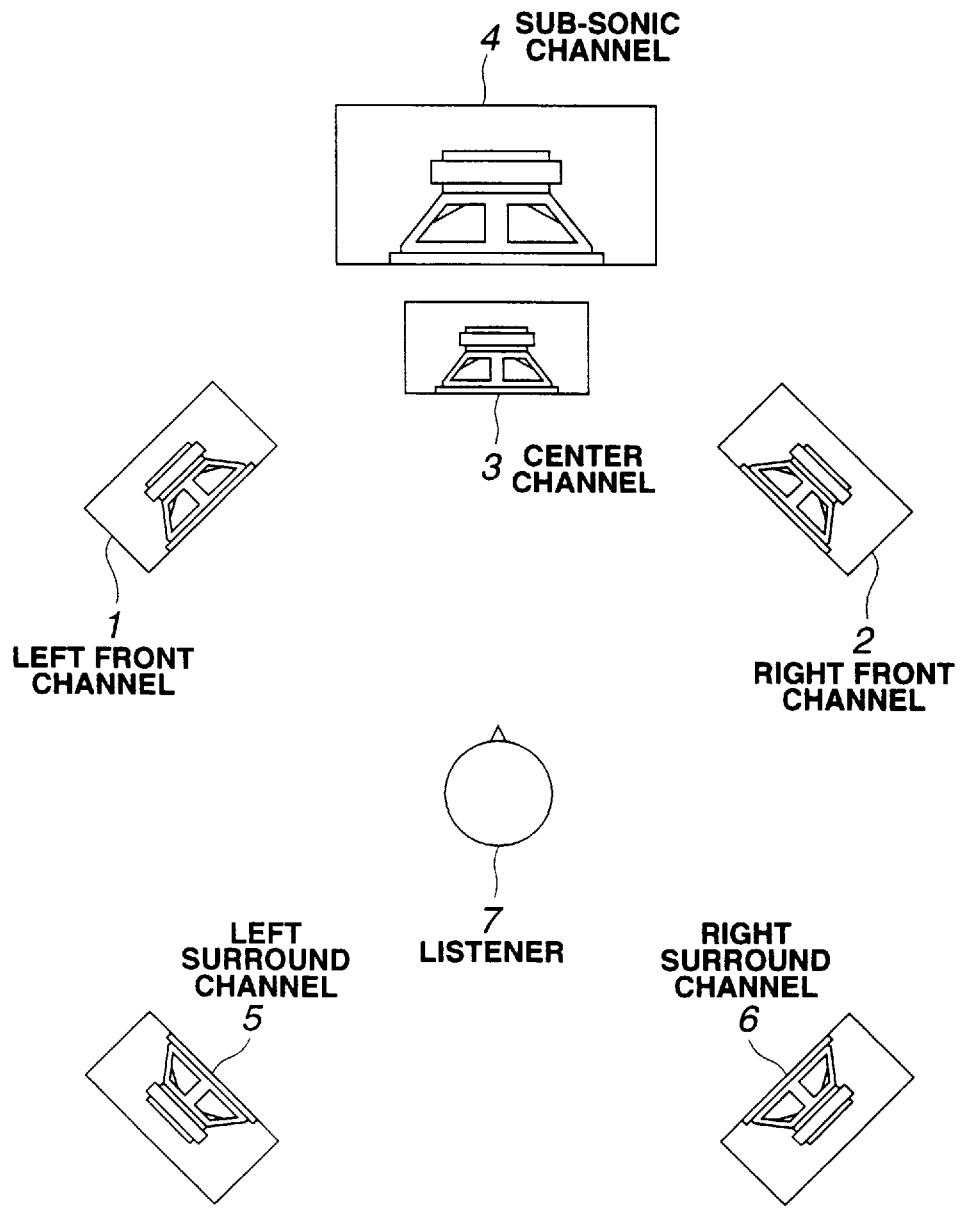
FIG. 1 is a model view showing a speaker system for reproducing audio sources of multi channels.
Figure 2:
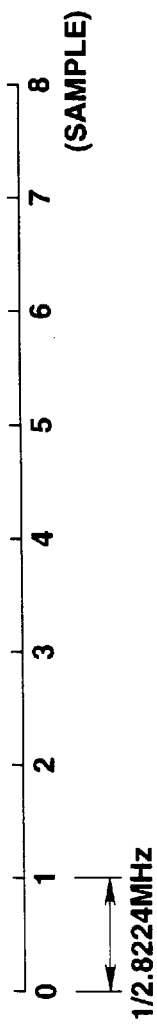
FIG. 2A is a view showing a data structure of the conventional left front channel data LF.
FIG. 2B is a view showing a data structure of the conventional right front channel data RF.
FIG. 2C is a view showing a data structure of the conventional center channel data CN.
FIG. 2D is a view showing a data structure of the conventional sub-sonic channel data SS.
FIG. 2E is a view showing a data structure of the conventional left surround channel data LS.
FIG. 2F is a view showing a data structure of the conventional right surround channel data RS.

In general, as for the 6-channel sound source as shown in FIG. 1, the right front channel 2 and the left front channel 1 are required to keep their sound qualities high. On the other hand, the auxiliary audio signals, that is, the center channel signal 3, the sub-sonic channel 4, the left surround channel 5 and the right surround channel 6 are not required to keep their sound qualities so high.

The current digital audio system just allows the passing band to keep its maximum range as low as 20 kHz. This figure critically covers the audible band. Hence, for lowering the data rate, it may be possible to lower the sampling frequency used for digitizing the auxiliary signals, that is, the center channel signal, the sub-sonic channel signal, the left surround channel signal and the right surround channel signal. In this case, however, the passing band is also made lower accordingly. It means that no sampling frequencies except the sampling frequency for the sub-sonic channel signal can be lowered. On the other hand, the one-bit sigma-delta (ΣΔ) modulated digital signal obtained by the sigma-delta (ΣΔ) modulating process allows the audible band with a far higher band range to be recorded. This makes it possible to cover the audible band if the sampling frequency is changed from 64 fs to a far lower value. The lower sampling frequency leads to degrading the dynamic range of the audible band to some extent. Even the degraded dynamic range sufficiently covers the characteristic required for reproducing the right surround and the left surround channel signals.

As mentioned above, for the sampling frequency that is far higher than the audible band, the sampling frequencies of the first sigma-delta (ΣΔ) modulating unit 15 and the second sigma-delta (ΣΔ) modulating unit 23 may be made different from each other, such as 64 fs for the first modulating unit 15 and 32 fs for the second modulating unit 23. The first sigma-delta (ΣΔ) modulating unit 15 receives a sampling clock of the frequency 64 fs from a clock input terminal 14. The second sigma-delta (ΣΔ) modulating unit 23 receives a sampling clock of the frequency 32 fs from a clock input terminal 22.

Figure 5:
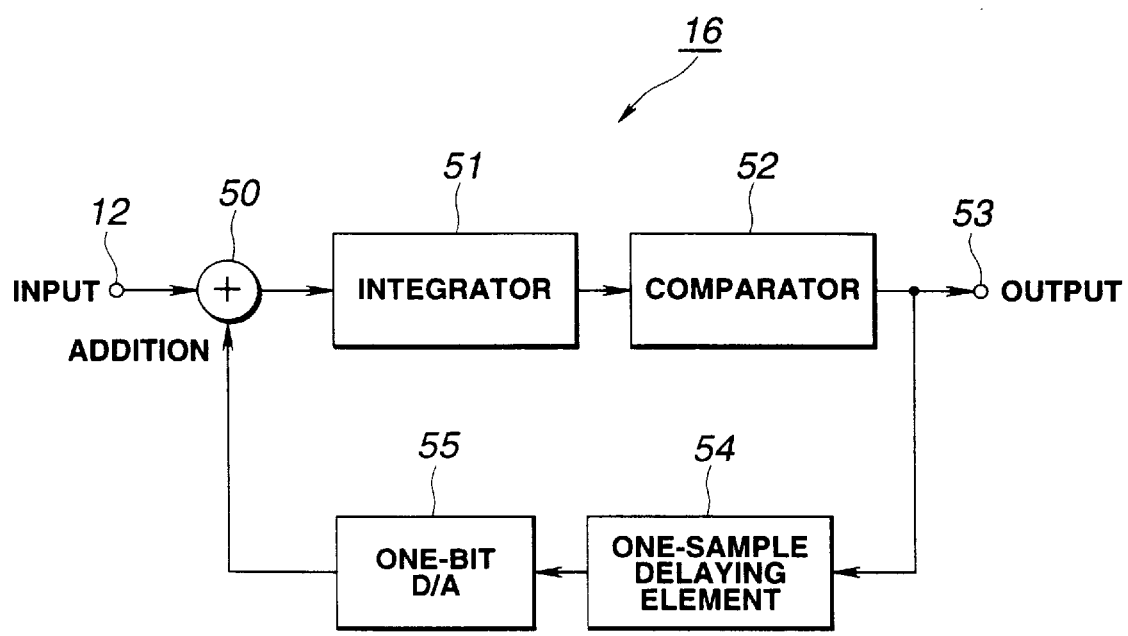
FIG. 5 is a block diagram showing a sigma-delta modulator.
Figure 6:
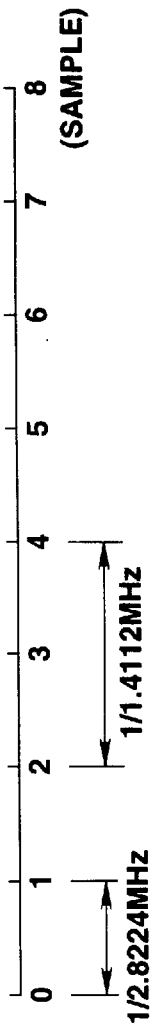
FIG. 6A is a view showing a data structure of left front channel data LF applied to the present invention.
FIG. 6B is a view showing a data structure of right front channel data RF applied to the present invention.
FIG. 6C is a view showing a data structure of center channel data CN applied to the present invention.
FIG. 6D is a view showing a data structure of sub-sonic channel data SS applied to the present invention.
FIG. 6E is a view showing a data structure of left surround channel data LS applied to the present invention.
FIG. 6F is a view showing a data structure of right surround channel data RS applied to the present invention.

The first sigma-delta (ΣΔ) modulating unit 15 includes a sigma-delta (ΣΔ) modulator 16 for the left front channel signal and a sigma-delta (ΣΔ) modulator 17 for the right front channel signal. The second sigma-delta (ΣΔ) modulating unit 23 includes a sigma-delta (ΣΔ) modulator 24 for the center channel signal, a sigma-delta (ΣΔ) modulator 25 for the sub-sonic channel signal, a sigma-delta (ΣΔ) modulator 26 for the left surround channel signal, and a sigma-delta (ΣΔ) modulator 27 for the right surround channel signal. The arrangement of each sigma-delta (ΣΔ) modulator is shown in FIG. 5.

The arrangement and the operation of the sigma-delta (ΣΔ) modulator 16 for the left front channel signal will be described with reference to FIG. 5. In FIG. 5, the left front channel signal is supplied from the input terminal 12 to an integrator 51 through an adder 50. The signal from the integrator 51 is supplied to a comparator 52. In the comparator 52, the signal is compared with the middle-point potential of the input audio signal so that one bit, for example, of the signal is quantized at each one sample period. The frequency of the sample period (sampling frequency) uses a 64-fold frequency of the sampling frequency 44.1 kHz used for the compact disk.

The quantized data is supplied to a one-sample delaying element 54 in which the data is delayed by one sample. The delayed data is converted into an analog signal through the effect of a one-bit digital-to-analog converter 55, for example. The analog signal is supplied to an adder 50 in which it is added to the left front channel signal sent from the input terminal 12. The quantized data output from the comparator 52, that is, a one-bit sigma-delta (ΣΔ) modulated signal, appears at the output terminal 53.

Hence, the sigma-delta (ΣΔ) modulation executed in the modulator 16 for the left front channel signal makes it possible to obtain the audio signal with a wide dynamic range even at a smaller number of bits by sufficiently raising the sampling frequency. Moreover, a wider transmissible frequency band is allowed.

The modulators 16 and 17 operate to supply to a multiplexer 28 the right front channel data RF and the left front channel data LF obtained by the sigma-delta (ΣΔ) modulation with the sampling clock of the frequency 64 fs, respectively. Further, the center channel signal sigma-delta (ΣΔ) modulator 24, the sub-sonic signal sigma-delta (ΣΔ) modulator 25, the left surround channel signal sigma-delta (ΣΔ) modulator 26, and the right surround channel signal sigma-delta (ΣΔ) modulator 27 operate to supply to the multiplexer 28 the center channel data CN, the sub-sonic channel data SS, the left surround channel data LS and the right surround channel data RS obtained by the sigma-delta (ΣΔ) modulation with the sampling clock, respectively.

The multiplexer 28 operates to convert six parallel pieces of data as shown in FIGS. 6A to 6F into serial data. The serial data is recorded on a magnetic tape through a recording head 29. For recording the serial data on the magnetic tape 30 through the recording head 29, the right front channel data RF and the left front channel data LF obtained by the sigma-delta (ΣΔ) modulation with the sampling frequency 64 fs, the center channel data CN obtained by the sigma-delta (ΣΔ) modulation with the sampling frequency 32 fs, the sub-sonic channel data SS, the left surround channel data LS and the right surround channel data RS are used for the recording. This operation just needs a smaller transfer rate and media capacity.

The data rate of the serial data supplied from the multiplexer 28 will be described below. The data rate of the right front channel data RF or the left front channel data LF obtained by the sigma-delta (ΣΔ) modulation with the sampling frequency 64 fs is 2.8224 Mbps, while the data rate of the center channel data CN, the sub-sonic channel data SS, the left surround channel data LS, or the right surround channel data RS is 1.4112 Mbps. Hence, the data rate of the serial data to be supplied from the multiplexer 28 is (2.8224×2+1.4112×4) p/p=11.2896 Mbps. This transfer rate is a third of 16.9344 Mbps of the foregoing prior art. This leads to reducing the media capacity required for recording a program source by two-thirds.

As shown in FIG. 4, the sigma-delta (ΣΔ) reproducing unit 32 includes a reproducing head 31, a separating circuit 33, a digital-to-analog converter 35 for the left front channel data, a digital-to-analog converter 36 for the right-front channel data, a digital-to-analog converter 37 for the center channel data, a digital-to-analog converter 38 for the sub-sonic channel data, a digital-to-analog converter 39 for the left surround channel data, and a digital-to-analog converter 40 for the right surround channel data.

The reproducing head 31 serves to read the serial data from the magnetic tape 30. The separating circuit 33 serves to separate the serial data into parallel data as shown in FIGS. 6A to 6F. These pieces of parallel data, that is, the right front channel data RF, the left front channel data LF, the center channel data CN, the sub-sonic channel data SS, the left surround channel data LS, and the right surround channel data RS are supplied to the digital-to-analog converter 36 for the right front channel data, the digital-to-analog converter 35 for the left front channel data, the digital-to-analog converter 37 for the center channel data, the digital-to-analog converter 38 for the sub-sonic channel data, the digital-to-analog converter 39 for the left surround channel data, and the digital-to-analog converter 40 for the right surround channel data, respectively. These digital-to-analog converters operate to convert the corresponding data into the analog audio signal.

Then, the sampling clock of the frequency 64 fs is supplied to the digital-to-analog converter 35 for the left front channel data and the digital-to-analog converter 36 for the right front channel data through an input terminal 34. Further, the sampling clock of the frequency 32 fs is supplied to the digital-to-analog converter 37 for the center channel data, the digital-to-analog converter 38 for the sub-sonic channel data, the digital-to-analog converter 39 for the left surround channel data, and the digital-to-analog converter 40 for the right surround channel data through a clock input terminal 41.

The left front channel signal, which is an analog signal converted by the digital-to-analog converter 35 for the left front channel data, is led out at an output terminal. The right front channel signal, which is also an analog signal converted by the digital-to-analog converter 35 for the right front channel data, is led out at an output terminal 43.

The center channel signal, which is also an analog signal converted by the digital-to-analog converter 37 for the center channel data, is led out at an output terminal 44. The sub-sonic channel signal, which is also an analog signal converted by the digital-to-analog converter 38 for the sub-sonic channel signal, is led out at an output terminal 45. The left surround channel signal, which is an analog signal converted by the digital-to-analog converter 39 for the left surround channel data, is led out at an output terminal 46. The right surround channel signal, which is an analog signal converted by the digital-to-analog converter 40 for the right surround channel data, is led out at an output terminal 47.

As described above, the sigma-delta ($\Sigma\Delta$) recording and reproducing apparatus 10 utilizes a variety of characteristics of channels in reproducing multi-channel signals being related to each other and a property of the one-bit sigma-delta ($\Sigma\Delta$) modulated digital signal, thereby suppressing increase of the data rate and the data capacity in spite of an increase in the number of channels.

Figure 7:
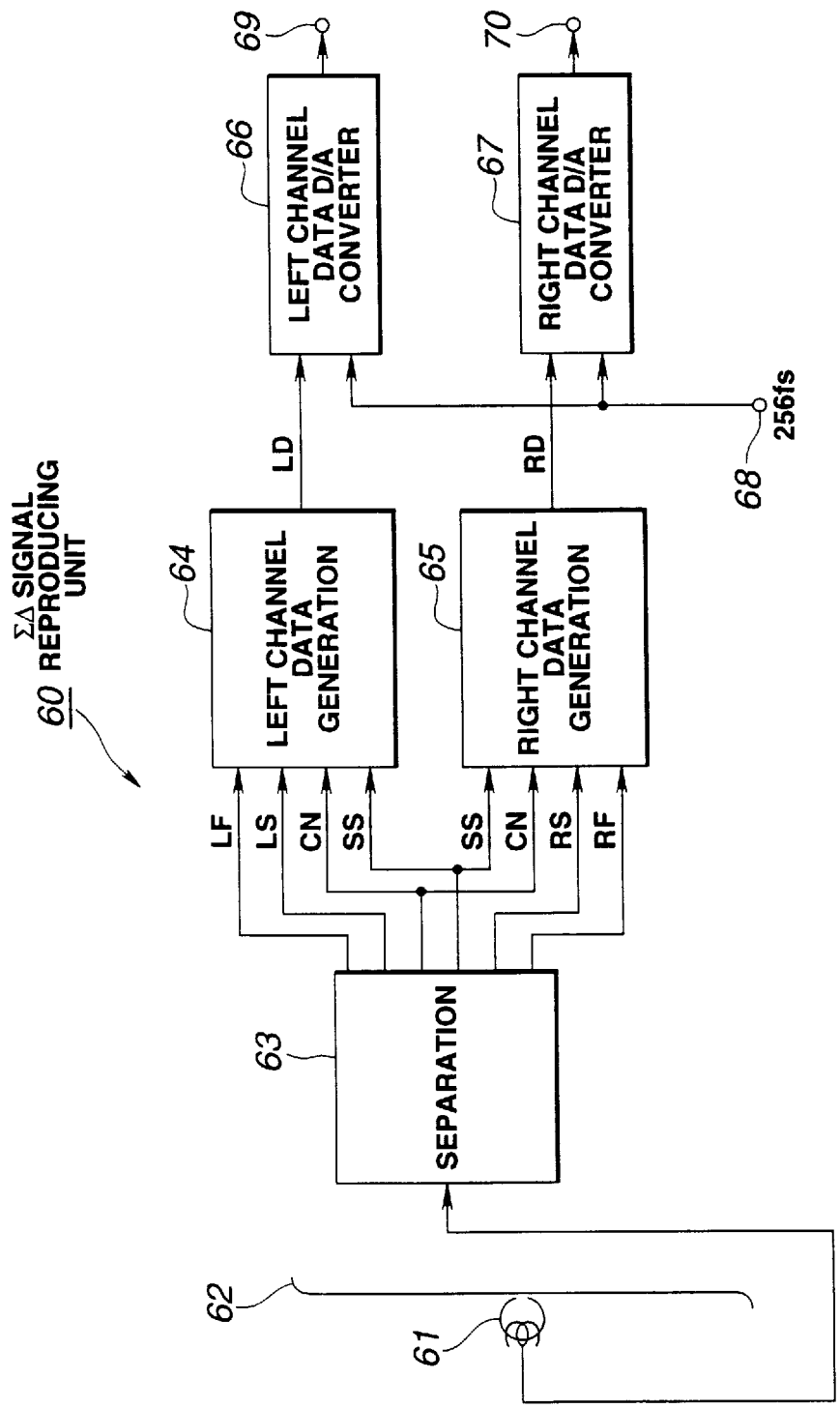
FIG. 7 is a block diagram showing a reproducing apparatus applied to the present invention.

In turn, the description will be oriented to a transformation of the sigma-delta ($\Sigma\Delta$) recording and reproducing apparatus 10 according to this embodiment. This transformation uses the sigma-delta ($\Sigma\Delta$) signal reproducing unit 60 shown in FIG. 7 in place of the sigma-delta ($\Sigma\Delta$) signal reproducing unit 32 shown in FIG. 4 so that the sigma-delta ($\Sigma\Delta$) signal reproducing unit 60 reproduces the signal recorded by the sigma-delta ($\Sigma\Delta$) signal recording unit 11 shown in FIG. 4. This transformation of the sigma-delta ($\Sigma\Delta$) signal recording and reproducing apparatus is arranged so that the sigma-delta ($\Sigma\Delta$) signal recording unit 11 temporarily records multi-channel signals from the multi-channel sound sources composed of six channels and then the sigma-delta ($\Sigma\Delta$) signal reproducing unit 60 reproduces the multi-channel signals through 2-channel sound sources for doing the 2-channel compatible reproduction. The description about the arrangement of the sigma-delta ($\Sigma\Delta$) signal recording unit 11 is not presented in this specification.

The sigma-delta ($\Sigma\Delta$) signal reproducing unit 60 includes a reproducing head 61, a separating circuit 63, a left channel data generating circuit 64, a right channel data generating circuit 65, a digital-to-analog converter 66 for the left channel data, and the digital-to-analog converter 67 for the right channel data. The reproducing head 61 serves to read the serial data recorded by the sigma-delta ($\Sigma\Delta$) signal recording unit 11 from the magnetic tape 62 (that is the same as the magnetic tape 30 of FIG. 4). The separating circuit 63 serves to separate the serial data into the parallel data as shown in FIGS. 6A to 6F.

The left channel data generating circuit 64 operates to generate the left channel data LD as shown in FIGS. 8A to 8F from the left front channel data LF, the center channel data CN, the sub-sonic channel data SS, and the left surround channel data LS. The right channel data generating circuit 65 operates to generate the right channel data RD as shown in FIG. 8H from the right front channel data RF, the center channel data CN, the sub-sonic channel data SS, and the right surround channel data RS.

Figure 8:
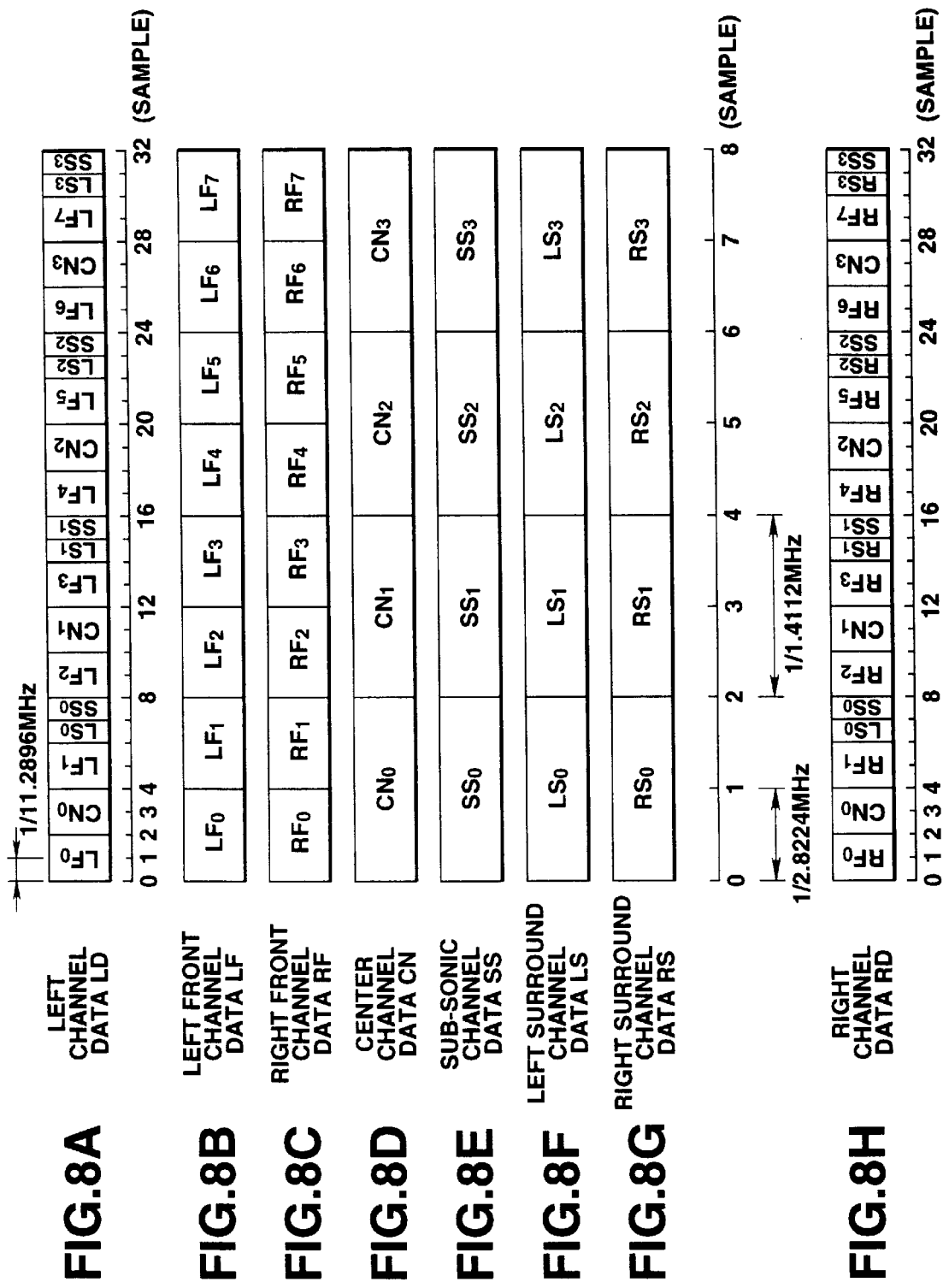
FIG. 8A is a view showing a data structure of left channel data LD applied to the present invention.
FIG. 8B is a view showing a data structure of left front channel data LF applied to the present invention.
FIG. 8C is a view showing a data structure of right front channel data RF applied to the present invention.
FIG. 8D is a view showing a data structure of center channel data CN applied to the present invention.
FIG. 8E is a view showing a data structure of sub-sonic channel data SS applied to the present invention.
FIG. 8F is a view showing a data structure of left surround channel data LS applied to the present invention.
FIG. 8G is a view showing a data structure of right surround channel data RS applied to the present invention.
FIG. 8H is a view showing a data structure of right channel data RD applied to the present invention.

The digital-to-analog converter 66 for the left channel data operates to convert the left channel data LD as shown in FIG. 8A into an analog audio signal at the sampling clock of the frequency 256 fs supplied at a clock input terminal 68. This left channel analog audio signal is led out at an output terminal 69. The digital-to-analog converter 67 for the right channel data operates to convert the right channel data RD as shown in FIG. 8C into an analog audio signal at the sampling clock of the frequency 256 fs supplied at the input terminal 68. This right channel analog audio signal is led out at an output terminal 70.

The left channel data generating circuit 64 operates to expand the left front channel data LF, the center channel data CN, the sub-sonic channel data SS, and the left surround channel data LS on the time base as considering the sampling frequency used for the sigma-delta ($\Sigma\Delta$) modulation and a mix-down ratio.

The right channel data generating circuit 65 operates to expand the right front channel data RF, the center channel data CN, the sub-sonic channel data SS, and the right surround channel data RS on the time base as considering the sampling frequency used for the sigma-delta ($\Sigma\Delta$) modulation and a mix-down ratio.

In these operations, as mentioned above, the sampling clock used for the digital-to-analog converter 66 for the left channel data and the digital-to-analog converter 67 for the right channel data is 256 fs. In actual, however, since the reproducing level ratio of each channel in the 2-channel compatible reproduction is proportional to an occupied area of each data per a unit time, the ratio of the left front channel data LF, the center channel data CN, the sub-sonic channel data SS, and the left surround channel data LS contained in the left channel data LD is 4:2 : 1:1. Likewise, the ratio of the right front channel data RF, the center channel data CN, the sub-sonic channel data SS and the right surround channel data RS contained in the right channel data SD is 4:2:1:1. By raising the sampling clock, the occupied area of each data per unit time is allowed to be more finely controlled. This operation makes it possible to control the balance of the signals of the 2 channels. More specifically, this operation makes it possible to pre-record the data for controlling the occupied area of each data per unit time on a portion for a table-of-contents (TOC) of a media in each tune and change the reproducing balance on the control data.

Figure 9:
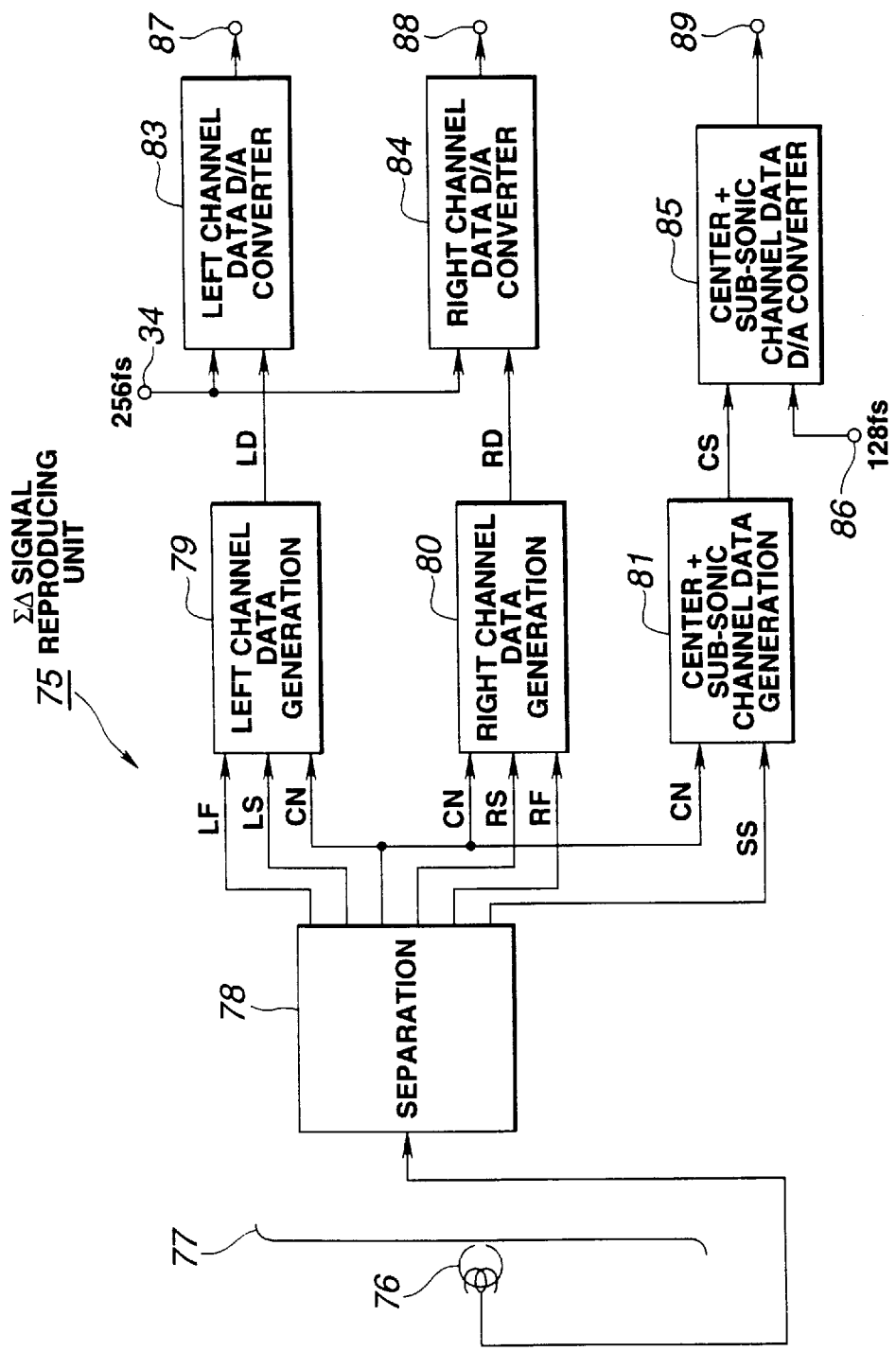
FIG. 9 is a block diagram showing a reproducing apparatus according to another embodiment of the present invention.

Next, the description will be oriented to another transformation of the sigma-delta (ΣΔ) signal recording and reproducing apparatus 10. This transformation is a sigma-delta (ΣΔ) signal recording and reproducing apparatus which is arranged to use a sigma-delta (ΣΔ) signal reproducing unit 75 as shown in FIG. 9 in place of the reproducing unit 32 shown in FIG. 4 and reproduce the signal recorded by the sigma-delta (ΣΔ) signal recording unit 11 shown in FIG. 4 with the sigma-delta (ΣΔ) signal reproducing unit 75. This modulated sigma-delta (ΣΔ) signal recording and reproducing apparatus is arranged so that the sigma-delta (ΣΔ) signal recording unit 11 temporarily records as serial data the multi-channel signals of six channels on a magnetic tape and then the sigma-delta (ΣΔ) signal reproducing unit 75 mixes the serial data down to the three channel signals in reproducing the serial data. Herein, the description about the arrangement of the sigma-delta (ΣΔ) signal recording unit 11 is not presented in this specification.

The sigma-delta (ΣΔ) signal reproducing unit 75 includes a reproducing head 76, a separating circuit 78, a left channel data generating circuit 79, a right channel data generating circuit 80, a center plus sub-sonic channel data generating circuit 81, a digital-to-analog converter 83 for the left channel data, a digital-to-analog converter 84 for the right channel data, and a digital-to-analog converter 85 for the center plus sub-sonic channel data.

Figure 3:
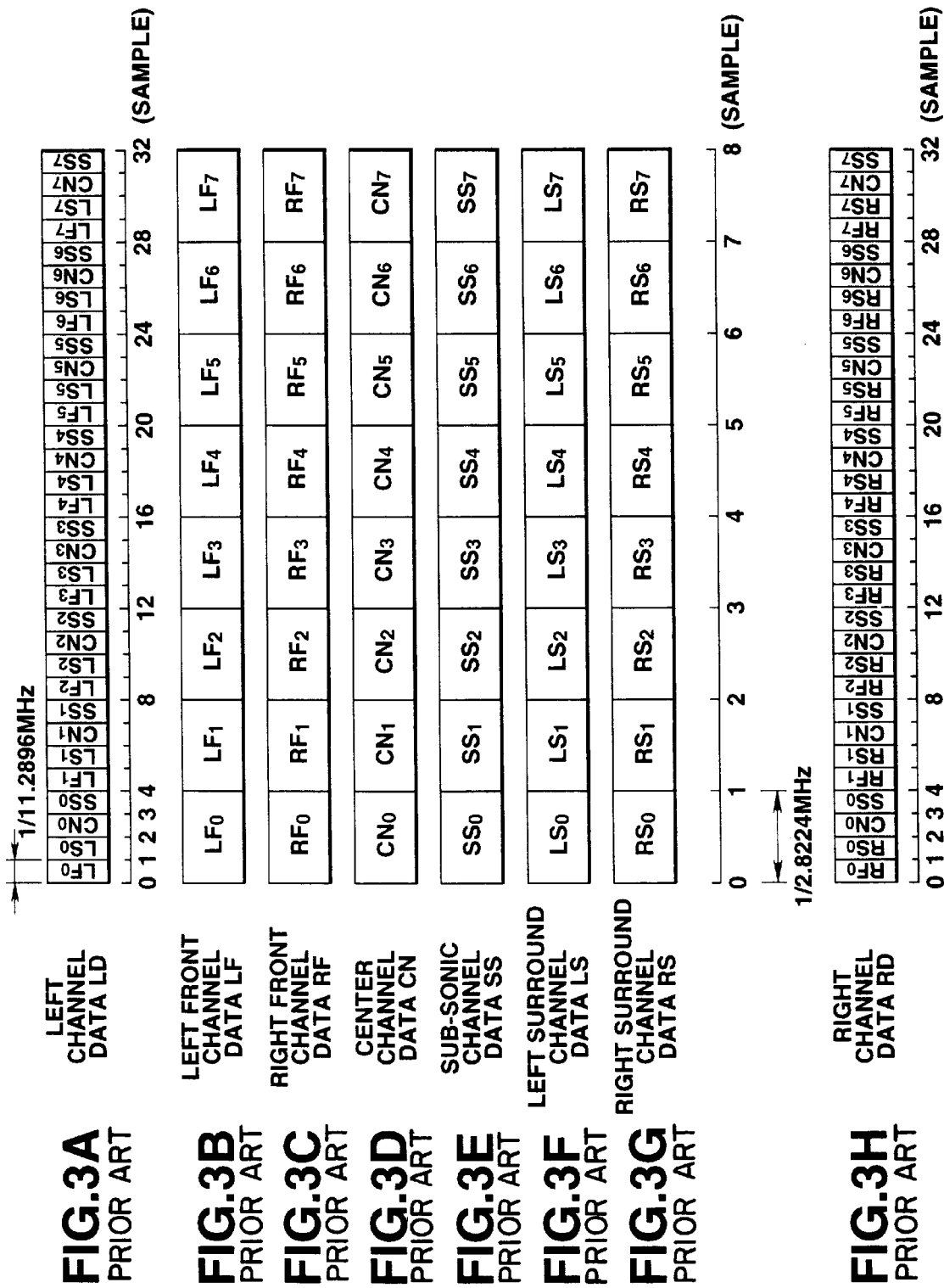
FIG. 3A is a view showing a data structure of the conventional left channel data LD.
FIG. 3B is a view showing a data structure of the conventional left front channel data LF.
FIG. 3C is a view showing a data structure of the conventional right front channel data RF.
FIG. 3D is a view showing a data structure of the conventional center channel data CN.
FIG. 3E is a view showing a data structure of the conventional sub-sonic channel data SS.
FIG. 3F is a view showing a data structure of the conventional left surround channel data LS.
FIG. 3G is a view showing a data structure of the conventional right surround channel data RS.
FIG. 3H is a view showing a data structure of the conventional right channel data RD.

The reproducing head 76 serves to read the serial data from the magnetic tape 77 (which is the same as the magnetic tape 30). As mentioned above, the serial data has been recorded on the magnetic tape 77. The separating circuit 78 serves to separate the serial data into the parallel data as shown in FIG. 3.

The left channel data generating circuit 79 serves to generate the left channel data LD as shown in FIGS. 10A to 10I from the left front channel data LF, the center channel data CN and the left surround channel data LS. The right channel data generating circuit 80 serves to generate the right channel data RD as shown in FIG. 10I from the right front channel data RF, the center channel data CN and the right surround channel data RS. The center plus sub-sonic channel data generating circuit 81 serves to generate the center plus sub-sonic channel data CS from the center channel data CN and the sub-sonic channel data SS.

The digital-to-analog converter 83 for the left channel data serves to convert the left channel data LD as shown in FIG. 10A into an analog audio signal at a sampling clock of the frequency 256 fs supplied from a clock input terminal 82. The resulting analog audio signal for the left channel is led out at an output terminal 87. The digital-to-analog converter 84 for the right channel data serves to convert the right channel data RD as shown in FIG. 10H into an analog audio signal at a sampling clock of the frequency 256 fs supplied from the clock input terminal 82. The resulting analog audio signal for the right channel is led out at a output terminal. The digital-to-analog converter 85 for the center plus sub-sonic channel data CS serves to convert the center plus sub-sonic channel data CS as shown in FIG. 10I into an analog audio signal at a sampling clock of the frequency 128 fs supplied from the clock input terminal 86. The resulting analog audio signal is led out at an output terminal 89.

The left channel data generating circuit 79 expands on the time base the left front channel data LF, the center channel data CN and the left surround channel data LS produced by the separating circuit 78 as considering the sampling frequencies and the mix-down ratios of these data used in the sigma-delta (ΣΔ) modulation.

The right channel data generating circuit 80 expands on the time base the right front channel data RF, the center channel data CN, the right surround channel data RS as considering the sampling frequencies and the mix-down ratios of these data used in the sigma-delta (ΣΔ) modulation.

Further, the center plus sub-sonic channel data generating circuit 81 expands on the time base the center channel data CN and the sub-sonic channel data SS produced by the separating circuit 78 as considering the sampling frequencies and the mix-down ratios of these data used in the sigma-delta (ΣΔ) modulation.

By pushing up the sampling clock more, it is possible to more minutely control an occupied area of each data per time unit. This therefore makes it possible to control the balance of the left channel data LD, the right channel data RD and the center plus sub-sonic channel data CS. For example, for changing the reproducing balance, it is possible to record the data for controlling the occupied area of each data per a time unit on a portion corresponding to the table-of-content (TOC) of the media in each program.

The foregoing embodiment and its transformations are arranged to use multi-channel signals of six channels. The number of the channels is not limited to six. It may be four, eight and so forth. Also, the number of the mixed down channels is not limited to three.

Further, the foregoing embodiment and its transformations are arranged to convert the sigma-delta (ΣΔ) modulated signal into the serial data before recording the signal on the magnetic tape. Two or more recording heads make it possible to record the sigma-delta (ΣΔ) modulated signal on the magnetic tape without changing it to the serial data. In place of the magnetic tape, the recording media may be a magnetic disk or a magneto-optical disk (MO).

Moreover, the present invention may be applied to the transmission and the receipt through a wireless or a wired path. In place of the foregoing description, the recording unit may record the signals of the six channels as the signals of the two channels and then the reproducing unit may compatibly reproduce the signals of the two channels with only two digital-to-analog converters.

The method for transmitting a signal according to the present invention is arranged to make the sampling frequency for a signal of at least one channel of two or more channel signals different from the sampling frequency for the signal(s) of the other channel(s), sigma-delta (ΣΔ) modulate the signals of these channels, and transmit the modulated signals. If the information content of at least one channel signal is more than that of the other channel signal(s), the sampling frequency for at least one channel signal is set to be higher than that for the other channel signal(s). Hence, the method according to the present invention just needs a smaller transfer rate and media capacity than those used for the conventional recording and reproduction of the digital signal one-bit signal-delta modulated according to the simple sampling rate system in the multi-channel sound source, for realizing high-quality multi-channel reproduction though the method of the invention has the same number of channels.

On the side where the signal is transmitted, that is, the reproducing or receiving side, the sigma-delta ($\Sigma\Delta$) modulated signals of m channels are expanded on the time base of each stream of n (m>n) channels according to the sampling frequency and the mix-down ratio of each channel, for realizing the compatible reproduction. Hence, the method of the present invention enables to realize the balance control in the two-channel compatible reproduction, which could not be realized in the conventional transmission of the digital signal one-bit sigma-delta ($\Sigma\Delta$) modulated according to the simple sampling rate system in the multi-channel sound source. Further, the method of the present invention enables to realize the mix-down from one number of plural channels to another number and its balance control.

In the apparatus for transmitting a signal according to the present invention, the first sigma-delta modulating unit is served to sigma-delta modulate part of multi-channel signals composed of at least two channel signals, related to each other, at the first sampling frequency. The second sigma-delta modulating unit is served to sigma-delta modulate the remaining part of the multi-channel signals at the second sampling frequency and transmit the resulting sigma-delta modulated signal. Hence, the transmitting apparatus of the present invention just needs a smaller transfer rate and media capacity than the conventional recording and reproduction of the digital signal one-bit sigma-delta ($\Sigma\Delta$) modulated according to the simple sampling rate system in the multi-channel sound source, for realizing high-quality multi-channel reproduction though the apparatus of the invention has the same number of channels as the conventional apparatus.

Moreover, on the side where the signal is to be transmitted, that is, the reproducing or the receiving side, the sigma-delta modulated signals of m channels are expanded on the time base of each stream of n (m>n) channels according to the sampling frequency and the mix-down ratio of each channel, for realizing the compatible reproduction. Hence, the apparatus of the present invention enables realizing the balance control in two-channel compatible reproduction, which could not be realized by the conventional transmission of the digital signal one-bit sigma-delta ($\Sigma\Delta$) modulated according to the simple sampling rate system. Further, the apparatus of the invention enables realizing the mix-down of one number of plural channels to another number and its balance control.

What is claimed is:

1. A signal transmitting apparatus for transmitting a sigma-delta modulated signal produced by performing sigma-delta modulation with respect to each signal of multi-channel signals composed of at least two channels, the apparatus comprising:

first modulating means for sigma-delta modulating signals of one group of said multi-channel signals at a first sampling frequency substantially higher than an audio band frequency;

second modulating means for sigma-delta modulating signals of another group of said multi-channel signals at a second sampling frequency, said second sampling frequency being substantially higher than said audio band frequency but lower than said first sampling frequency;

mixing means for mixing a digital signal output from said first modulating means with a digital signal output from said second modulating means; and means for transmitting a mixed digital signal produced by said mixing means.

2. The signal transmitting apparatus as claimed in claim 1, wherein said multi-channel signals comprise multi-channel audio signals, said one group of said multi-channel signals corresponds to main right and main left channels, and said another group of said multi-channel signal corresponds to auxiliary audio signals.

3. The signal transmitting apparatus as claimed in claim 1, further comprising separating means for expanding said sigma-delta modulated signal to be transmitted by said transmitting means on a time base of a smaller number of channels than a number of said multi-channel signals according to the first sampling frequency and a mix-down ratio of each channel.

4. The signal transmitting apparatus as claimed in claim 1, wherein said transmitting means for transmitting said mixed digital signal includes means for performing serial transmission.

5. A signal transmitting method for transmitting a sigma-delta modulated signal produced by performing sigma-delta modulation with respect to each channel signal of multi-channel signals composed of at least two channels, comprising:

a first step of sigma-delta modulating a signal of one group of said multi-channel signals at a first sampling frequency substantially higher than an audio band frequency;

a second step of sigma-delta modulating a signal of another group of said multi-channel signals at a second sampling frequency substantially higher than the audio band frequency but lower than said first sampling frequency;

a third step of mixing a digital signal produced at said first step with a digital signal produced at said second step and producing a mixed digital signal; and a fourth step of transmitting said mixed digital signal.

6. The signal transmitting method as claimed in claim 5, wherein said multi-channel signals are multi-channel audio signals, said one group of said multi-channel signals correspond to main right and main left channels, and said another group of said multi-channel signals correspond to auxiliary audio signals.

7. The signal transmitting method as claimed in claim 5, further comprising a separating step of expanding a sigma-delta modulated signal produced by performing said sigma-delta modulation with respect to each signal of said multi-channel signals on a time base of each of a number of channels less than said multi-channels.

8. The signal transmitting method as claimed in claim 5, wherein said step of transmitting the mixed digital signal includes performing serial transmission.

* * * * *